United States Patent

[11] 3,608,849

[72] Inventor William F. Underwood
Oak Park, Ill.
[21] Appl. No. 840,635
[22] Filed July 10, 1969
[45] Patented Sept. 28, 1971
[73] Assignee Union Carbide Corporation
New York, N.Y.
Continuation-in-part of application Ser. No. 698,756, Jan. 18, 1968, now abandoned.

[54] AERONAUTICAL BALLOONS
4 Claims, 1 Drawing Fig.
[52] U.S. Cl..................................................... 244/31

[51] Int. Cl...................................................... B64b 1/40
[50] Field of Search........................................... 244/31

[56] References Cited
UNITED STATES PATENTS
3,149,017 9/1964 Ehrreich et al. ............... 244/31
3,182,932 5/1965 Winker.......................... 244/31

Primary Examiner—Milton Buchler
Assistant Examiner—Steven W. Weinrieb
Attorneys—Paul A. Rose and John F. Hohmann ABSTRACT: An aeronautical balloon is fabricated from a biaxially oriented plastic film which is obtained from a polyolefin resin composition comprising a homopolymer of copolymer of ethylene of at least about 50 percent by weight.

Aeuronautical Balloon

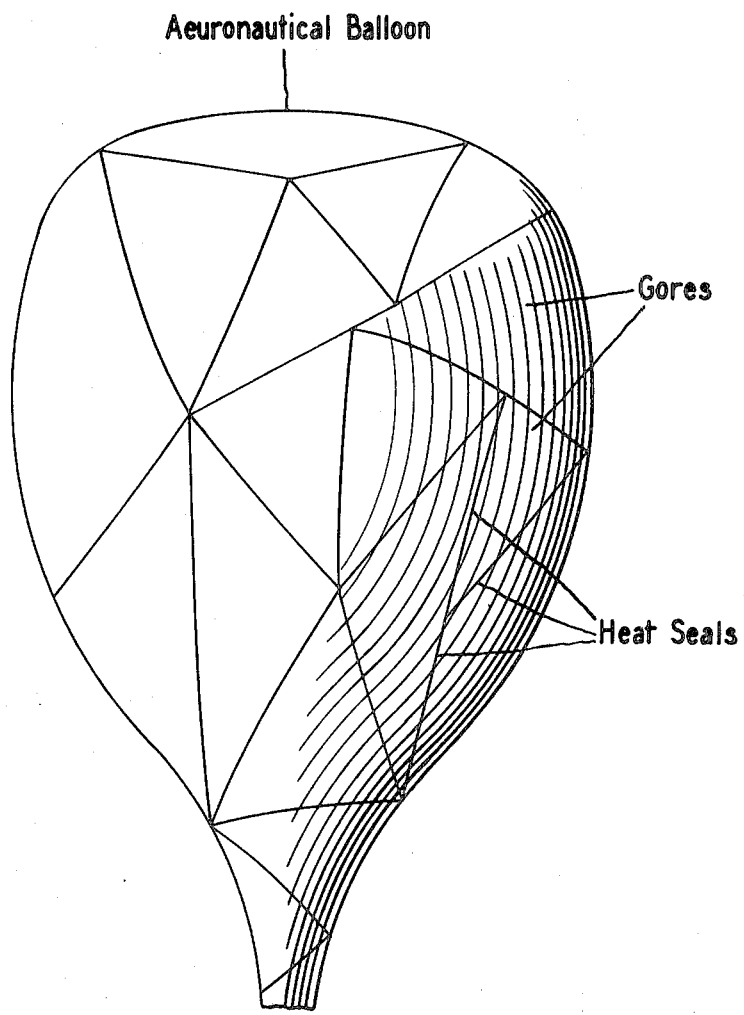

AERONAUTICAL BALLOONS

This application is a continuation-in-part of application Ser. No. 698,756, now abandoned, filed Jan. 18, 1968.

The present invention relates to plastic aeronautical balloons. More particularly, the present invention relates to the use of plastic films having significantly improved properties and characteristics for their use as aeronautical balloon films.

The use of aeronautical balloons has been and continues to be a basic and inexpensive means by which private research scientists as well as those in our armed forces gather data for the study of high-altitude air currents and accumulate biological, electronic and astronomical information at high altitudes. More recently, balloons have been widely utilized in the study and development of space reentry parachutes and ballute systems; that is, geometric deceleration devices.

In these efforts, balloons of all sizes have been employed. For example, large balloons; that is, those having a 5,000 to 26,000 cubic foot capacity, have been utilized in such projects as astronomical observations, lifting equipment and devices to measure atmospheric or wind conditions as well as radiation intensities at various altitudes, lifting parachutes and ballute systems to test and evaluate their performance at altitudes of from about 130,000 to 150,000 feet with particular attention to the deceleration rate of descent of personnel and equipment from space, lifting explosives to predetermined altitudes to study and evaluate their explosive effects at these altitudes, and the like. Similarly, small balloons; that is, those measuring about 2 meters in diameter, have been and are employed to gather research data regarding upper atmospheric wind and weather conditions, meteorological information, and the like.

Heretofore, the films utilized to fabricate these balloons have typically been selected from such materials as blown polyethylenes and polyurethanes, polyethylene films reinforced with Dacron fibers, and the like. These commercially obtained films are normally all blown films and are generally thin-walled films measuring about 2.0 mils in thickness or less.

In constructing aeronautical balloons from these materials, large sheets of film are cut into a plurality of equally dimensioned strips called "gores." These gores are then heat sealed together to form a balloon structure.

It has been observes that the points at which these gores are heat sealed appear to be weak points of these balloons. One means employed to overcome this apparent weakness has been to use a strip of glass reinforced plastic film tape at the heat seals. Generally this reinforcing tape is fabricated from two pieces of thin-walled plastic film measuring about 2 mils in thickness which is then used to form a heat seal "sandwich" enclosing several strands of relatively thick gauged glass filaments.

The balloons fabricated with these reinforced plastic film tapes are generally designed to support their rated load capacities when the balloons are fully inflated and have lifted to an altitude of from about 130,000 to 150,000 feet. Under these conditions, it is expected that negligible stress will be exerted on the heat seals uniting the gores. Before the balloon becomes fully inflated, however, it assumes an elongated or tear drop configuration making it difficult to determine and assess the stresses acting on the heat seals at this point but it is suspected that these stresses can be very great. Nonetheless, it appears as though high local stresses are exerted primarily during inflation of the balloon before it is launched and later when the fully inflated balloon encounters strong shearing wind velocities and cold temperatures as it passes into and through the troposphere at altitudes of from about 40,000 to 60,000 feet. At these altitudes, the wind velocity gradients encountered by the balloon can be as high as about 150 knots and span a distance of about 150 feet in height. The cold temperatures encountered by the balloon at these altitudes can dip to as low as about $-88°$ C. It has been observed that the majority of balloon failures, usually in the form of rips, tears or ruptures, occurs under one of the two conditions described immediately hereinabove.

The present trends and demands are toward the use of of aeronautical balloons to lift larger and heavier loads to higher altitudes. Such demands require the use of balloon materials which will possess even greater durability at lower cold temperatures, a higher mechanical efficiency and greater reliability of performance and strong, durable heat seals. These balloons will generally be the large balloons having a capacity of from about 20,000 to 26,000 cubic feet, preferably to be fabricated from plastic films having a single wall thickness of from about 0.5 to 1.0 mils and which can be lifted to altitudes in excess of 130,000 feet where they will encounter severe air turbulence and very low temperatures.

In order to be effective for their intended use, therefore, the plastic films utilized to fabricate these balloons should possess a tensile strength of at least about 3,400 pounds per square inch (p.s.i.) at a single wall thickness no greater than about 2.0 mils., good cold temperature strength and durability to withstand loading stresses or whipping action during low-temperature launchings and those stresses encountered in ascending through high-velocity airstreams at high altitudes, low gas permeability, low infrared absorption so as to minimize or eliminate any problems that might result from heat loss and, consequently, loss of lifting power during day-to-night flights, facility of fabrication, easily applicable and reliable heat seals and be of low cost. These films should also preferably have a sufficiently high tensile strength so that they can support heavy loads without undue distortion and good low temperature durability so that they will not fail by breaking or cracking due to brittleness when carrying heavy loads at high altitudes and encountering cold temperatures at high altitudes.

It is the general object of this invention, therefore, to provide a thin walled plastic film for use in the manufacture of aeronautical balloons which film can be easily fabricated and readily heat sealed, and which exhibits and possesses good flexibility at cold temperatures, has the ability to lift heavy loads without breaking, rupturing or becoming distorted, and can readily withstand excessive shear forces at high altitudes.

This and further objects of the invention will become more apparent from the ensuing discussion.

It has been found that the objects of the invention can be generally attained by providing a thin walled bioriented film obtained from a high molecular weight polyolefin resin. Suitable resins are homopolymers of ethylene and propylene and copolymers thereof with each other or other materials to be listed below. In the case of ethylene resins the intrinsic viscosity in decalin at 130° C. should be at least 1.2 deciliters per gram. In the case of propylene resins the intrinsic viscosity should be at least 1.5 and preferably should be in the range 2.0 to 4.5 deciliters per gram. The intrinsic viscosity limitation characterizes the orientability of the film made from such resins. As is known in the art orientability can be imparted to films made from resins of low intrinsic viscosity by irradiating the conventionally blown film. However, irradiation results in insolubility of the film in decalin at 130° C. and the intrinsic viscosity can not be readily measured by this technique.

When employing an ethylene homopolymer resin to obtain films which will exhibit good durability at low temperatures and have strong heat seals, it is preferred that the ethylene homopolymer have a density no greater than about 0.925, and preferably less than about 0.919.

As above indicated resins for use in the invention include copolymers of ethylene and propylene as well as homopolymers. Additionally resins produced by the copolymerization of ethylene or propylene with other monomers are suitable, provided such copolymers contain at least about 50 percent polyolefin. Suitable monomers for copolymerization include vinyl acetate, methyl acrylate, acrylic acid, ethyl acrylate, neohexene, methacrylic acid and the like as well as others well known to those skilled in the art.

The polyolefin resins of the invention can also have incorporated therein the usual amounts of well-known and often used stabilizers, lubricants and the like as well as other additives, such as colorants, surfactants and the like, provided they do not deleteriously affect the properties and characteristics desired and required to be obtained in the subsequently fabricated polyolefin film.

The tubular films from which aeronautical ballons can be subsequently fabricated can be readily extruded from polyolefin resin formulations in accordance with any conventional dry blending and extrusion techniques and oriented by methods and techniques well known to those skilled in the art. Preferably, the double-bubble process, is used to produce these biaxially oriented films. In this process a primary tube is first formed by melt extrusion from a die, inflated by the admission of air, cooled, collapsed, and then reinflated to form an isolated bubble, and the tubing is advanced through a heating zone to raise the film to its draw temperature. In the draw or expansion zone the film is radially expanded in both the transverse and machine directions at a temperature about 5° to 50° F. below the crystalline melting point of the resin such tat orientation occurs in both directions,—the expansion of the tubing being accompanied by a sharp, sudden reduction of thickness at the draw point. Films suitable for use in the invention should have the degree of orientation imparted by a stretching of at least about 300 percent in both machine and transverse directions. Preferably this stretching and orientation should be obtained in the secondary bubble, but a part of the orientation may be obtained in the primary tube. The degree of biorientation that can be induced in the film can be readily controlled by regulating the temperature to which the film is subjected during biaxial orientation thereof. Alternatively, the well-known centering techniques may be employed for biorientation of the films obtained in sheet form.

In accordance with methods and apparatus equally familiar to those skilled in the art, the biaxially oriented polyolefin films of the invention can also be subjected to annealing processes. While annealing the biaxially oriented films is not critical to obtain the desired and required properties and characteristics in these biaxially oriented films, it has been found helpful to further reduce and substantially eliminate the tendency of the film to pucker when being heat sealed.

The films of the invention are further illustrated through the following examples which are set forth as being merely representative and are not intended, in any way, to be limitative thereof.

EXAMPLE I

Several films were tested and evaluated for their use as aeronautical balloon films. The results of typical tests and evaluations are set forth in table I below wherein the films are designated by letters A–G, inclusive. Films A–F were obtained from ethylene homopolymer resins and Film G was obtained from an ethylene vinyl acetate copolymer having 28 percent vinyl acetate copolymerized therein. Films A, C, D, F and G were biaxially oriented and of these, Films A and F were biaxially oriented to a magnitude of at least 300 percent in the machine direction and in the transverse direction. Films B and E were blown films having a high blow ratio; that is, the ratio of the flat width of the blown film versus the diameter of the extruder nozzle through which the film was extruded. The blow ratio of Films B and E were each at least about 6.5:1. The Tensile Strengths for the films at various temperatures were determined according to the ASTM methods identified therein while the values for "Cold Brittleness Temperature" were determined according to MIL–P–4640A (USAF). The MIL–P–4640A (USAF) test method is carried out with apparatus comprising, essentially, an inclined plane equipped with a track down which a steel ball of known density and weight is rolled. The end of the inclined plane is equipped with a drum over which a film sample is securely placed. The temperature at which the film samples are tested as well as the components of the apparatus are all closely regulated and controlled. The cold brittleness temperature of the film samples is taken as that temperature at which the rupturing of the film by steel ball ceases to be classifiable as a ductile tear and is, instead, classifiable as being shattered.

Similar tests have been made with polypropylene films and establish the utility of such films for the purpose of the invention.

From the data set forth in table I above, it can be seen that the tensile strength for the biaxially oriented films (A, C, D and F) was consistently good at depressed temperatures. Of the biaxially oriented films, Films A and F revealed significantly better tensile strength properties at depressed temperatures.

Of paramount significance, as shown in Table I, are the exceptional cold brittleness temperatures, exhibited by Films A and F which were each biaxially oriented to a magnitude in excess of 300 percent in the machine direction and in the transverse direction.

While not intending to be bound by any theories, it is believed that biaxial orientation of the films in excess of 300 percent in the machine direction and in the transverse direction taken together with relatively low resin densities and relatively high resin intrinsic viscosities results in obtaining those properties in polyolefin films which renders them particularly useful for fabricating aeronautical balloons.

AS can be seen from table I above, Films A and F exhibit the best results which is attributed to the relatively low densities and the relatively high intrinsic viscosities of the resins from which these films were obtained. It should be noted, however, that Film D exhibited good tensile strength at low temperatures and an acceptable cold brittleness performance even through it was obtained from a resin having a relatively higher density.

TABLE I

| Film | A | B[1] | C | D | E[1] | F | G |
|---|---|---|---|---|---|---|---|
| Resin and film properties: | | | | | | | |
| Film thickness, mils | 1.0 | 0.75 | 0.8 | 0.5 | 1.5 | 1.0 | 1.2–1.5 |
| Resin density | 0.9175 | 0.9160 | 0.9193 | 0.96 | 0.9160 | 0.9167 | 0.9499 |
| Resin intrinsic viscosity (in Decalin at 130° C.) | 1.3 | 1.2 | 1.3 | | 1.2 | 1.3 | 1.46–1.48 |
| Tensile strength of films: | | | | | | | |
| Room temperature, ASTM 822–54T, Method A: | | | | | | | |
| MD | 3,500 | 10,500 | 10,400 | 3,520 | 10,700 | | 5,246 |
| TD | 3,500 | 12,900 | 20,900 | 3,790 | 10,900 | | 7,783 |
| −50° C., ASTM 882–64: | | | | | | | |
| MD | | | | | | 19,243 | 15,706 |
| TD | | | | | | 23,504 | 15,459 |
| −60° C., ASTM 882–64: | | | | | | | |
| MD | 13,250 | 7,000 | | | | 22,900 | |
| TD | 21,000 | 7,500 | | | | 28,500 | |
| −70° C., ASTM 882–64: | | | | | | | |
| MD | | | 13,350 | 20,000 | 16,700 | 7,240 | |
| TD | | | 22,500 | 28,300 | 36,900 | 5,940 | |
| Room temperature, ASTM 882–64, 10% secant modulus: | | | | | | | |
| MD | | | | | | 10,300 | 28,600 |
| TD | | | | | | 10,200 | 27,700 |
| Cold brittleness temperature of film MIL 4640A (USAF) | (2) | (3) | (4) | (5) | (6) | (7) | |

[1] Blown but not bioriented.
[2] Below −150° C.
[3] Shatters at −80° C.
[4] Ductile at −74° C.
[5] Ductile at −70° C.
[6] Shatters at −70° C.
[7] Below −99° C.

EXAMPLE II

An important property which the films of this invention should exhibit for their use as aeronautical balloons is their flexibility at low temperatures. To determine this, various films were coiled into a loose roll and then immersed in liquid nitrogen (−196° C.) for about 30 seconds. The films were then removed from the liquid nitrogen and subjected to severe flexing by hand. The results of these tests as determined by a visual examination of the films after flexing are set forth in table II below. In table II, the films designated by letters A, F and G were the same as in example I above, the film designated by letter H was a commercially obtained bioriented ethylene copolymerized with a propylene copolymer, the film designated by letter I was a commercially obtained bioriented ethylene-acrylic acid copolymer containing from about 3–6 percent acrylic acid, and Films J and K were commercially obtained blown polyethylenes each having a blow ratio of about 6.8:1.

TABLE II

| Films | A | F | G | H | I | J | K |
|---|---|---|---|---|---|---|---|
| Resin properties: | | | | | | | |
| Density | 0.9175 | 0.9167 | 0.9499 | <0.910 | | 0.9193 | 0.9180 |
| Intrinsic viscosity (in Decalin at 130° C.) | | | 1.46–1.48 | 2.75–2.79 | Insoluble | 1.3 | 1.23 |
| Film properties: | | | | | | | |
| Density | 0.9185 | 0.9174 | 0.955 | 0.910 | | 0.9197 | 0.9185 |
| Thickness (mils) | 1.0 | 1.0 | 1.2–1.5 | 1.0 | 0.75–0.90 | 1.0 | 1.0 |
| Condition of film after cold flexing | Undamaged | Undamaged | Undamaged | Undamaged | Undamaged | (¹) | (¹) |

¹ Shattered readily.

As can be seen from the results set forth in Table II above, all of the films which meet the criteria for the films of the invention (Films A and F–I) were undamaged. Although films J and K had similar resin and film properties as the other films and resins, they did not withstand cold flexing.

Although the invention has been set forth in some detail and described with particularity, it should be understood that changes, modifications and alterations can be made therein without departing from the scope and spirit of the invention.

What is claimed is:

1. An aeronautical balloon fabricated from a plastic film having a degree of biaxial orientation characteristic of that imparted by stretching at least about 300 percent in the machine direction and in the transverse direction, said plastic film being composed of a polyolefin resin selected from the group consisting of ethylene homopolymer, propylene homopolymer, ethylene copolymer and propylene copolymer, the polyolefin content of such copolymer being at least 50 percent, said film having an intrinsic viscosity in decalin at 130° C. of at least 1.2 in the case of ethylene polymers and at least 1.5 but not more than 4.5 in the case of propylene polymers, and said plastic film being characterized in that it exhibits a cold brittleness temperature not higher than −99° C.

2. An aeronautical balloon as defined by claim 6 in which said resin is a copolymer of said polyolefin with a monomer selected from the group consisting of vinyl acetate, methylacrylate, acrylic acid, ethylene acrylate, neohexene and methacrylic acid.

3. The aeronautical balloon of claim 6 wherein the polyolefin film is polyethylene having a density of less than about 0.919.

4. The aeronautical balloon of claim 6 wherein the polyolefin resin is polypropylene.

UNITED STATES PATENT OFFICE
CERTIFICATE OF CORRECTION

Patent No. 3,608,849              Dated    September 28, 1971

Inventor(s)       W. F. Underwood

It is certified that error appears in the above-identified patent and that said Letters Patent are hereby corrected as shown below:

Column 6, line 17, change "6" to --1--.

Column 6, line 32, change "ethylene" to --ethyl--.

Column 6, line 34, change "6" to --1--.

Column 6, line 37, change "6" to --1--.

Signed and sealed this 28th day of March 1972.

(SEAL)
Attest:

EDWARD M. FLETCHER, JR.          ROBERT GOTTSCHALK
Attesting Officer                Commissioner of Patents